(12) United States Patent
Newcombe et al.

(10) Patent No.: US 9,429,094 B2
(45) Date of Patent: Aug. 30, 2016

(54) MODULE FOR MANAGING MASS FLOW AND DAMPENING PRESSURE PULSATIONS IN A GASEOUS FUEL SUPPLY LINE

(71) Applicant: Westport Power Inc., Vancouver (CA)

(72) Inventors: Derek S. Newcombe, Vancouver (CA); Buerebista Ursu, Port Coquitlam (CA); Gregory A. Batenburg, Delta (CA)

(73) Assignee: WESTPORT POWER INC., Vancouver (CA)

( * ) Notice: Subject to any disclaimer, the term of this patent is extended or adjusted under 35 U.S.C. 154(b) by 323 days.

(21) Appl. No.: 14/229,996

(22) Filed: Mar. 31, 2014

(65) Prior Publication Data

US 2014/0230789 A1    Aug. 21, 2014

Related U.S. Application Data

(63) Continuation of application No. PCT/CA2012/050695, filed on Oct. 2, 2012.

(30) Foreign Application Priority Data

Oct. 5, 2011 (CA) ..................... 2754183

(51) Int. Cl.
*F02D 41/30* (2006.01)
*F02M 21/02* (2006.01)
(Continued)

(52) U.S. Cl.
CPC ............. *F02D 41/30* (2013.01); *F02D 19/022* (2013.01); *F02D 19/027* (2013.01);
(Continued)

(58) Field of Classification Search
CPC .... F02D 41/00; F02D 41/30; F02D 41/0027; F02D 19/022; F02D 19/027; F02M 21/02; F02M 21/0224; F02M 21/0227; F02M 21/0245; F16L 55/02; F16L 55/0278; F16L 55/0279; F16L 55/02718; F16L 55/02781; Y02T 10/32
See application file for complete search history.

(56) References Cited

U.S. PATENT DOCUMENTS 2,795,374 A    6/1957  Isakoff
2,943,641 A    7/1960  Arnold
(Continued)

FOREIGN PATENT DOCUMENTS

AU    730783 B2    3/2001
CA    1198507 A    12/1985
(Continued)

OTHER PUBLICATIONS

International Search Report and Written Opinion of the International Searching Authority issued on Jan. 8, 2013, in connection with International Application No. PCT/CA2012/050695.
(Continued)

*Primary Examiner* — Hieu T Vo
(74) *Attorney, Agent, or Firm* — Carie Mager; C. L. Kyle (57) ABSTRACT

A module for managing mass flow and dampening pressure pulsations in the supply line of a gaseous fuelled internal combustion engine comprises a hollow body defining an expanded volume that is fluidly connected directly to a pressure sensor and a temperature sensor. The module is placed along the supply line of a gaseous fuel engine between a fuel pressure increasing device and the fuel rail that supplies fuel to the engine. The module can comprise a filter that filters the impurities from the gaseous fuel supplied to the engine and an overpressure protection device that can vent some of the gaseous fuel from the module to protect it from over-pressurization.

32 Claims, 5 Drawing Sheets

(51) Int. Cl.
*F02D 19/02* (2006.01)
*F02D 41/00* (2006.01)
*F16L 55/027* (2006.01)
*F16L 55/033* (2006.01)
*F16L 55/02* (2006.01)

(52) U.S. Cl.
CPC ..... *F02D 41/0027* (2013.01); *F02M 21/0224* (2013.01); *F02M 21/0227* (2013.01); *F16L 55/0279* (2013.01); *F16L 55/02718* (2013.01); *F16L 55/02772* (2013.01); *F16L 55/02781* (2013.01); *F16L 55/0331* (2013.01); *F02D 2200/0602* (2013.01); *F02D 2200/0606* (2013.01); *F02D 2250/31* (2013.01); *F02M 21/0245* (2013.01); *Y02T 10/32* (2013.01)

(56) References Cited

U.S. PATENT DOCUMENTS

| | | | |
|---|---|---|---|
| 5,769,914 A | 6/1998 | Ku | |
| 6,067,963 A * | 5/2000 | Oi | F02M 69/462 123/458 |
| 7,146,700 B1 | 12/2006 | Darrah et al. | |
| 7,293,418 B2 | 11/2007 | Noble et al. | |
| 7,356,996 B2 | 4/2008 | Brook et al. | |
| 7,509,944 B2 * | 3/2009 | Okamura | F02D 41/3845 123/478 |
| 7,748,364 B2 | 7/2010 | Hanneke et al. | |
| 7,913,496 B2 | 3/2011 | Batenburg et al. | |
| 2002/0043249 A1 | 4/2002 | Lee et al. | |
| 2008/0097679 A1 | 4/2008 | Keays | |
| 2008/0226463 A1 | 9/2008 | Batenburg et al. | |
| 2009/0145400 A1 | 6/2009 | Hanneke et al. | |
| 2012/0160191 A1 | 6/2012 | Wang et al. | |

FOREIGN PATENT DOCUMENTS

| | | |
|---|---|---|
| CN | 101305239 A | 11/2008 |
| DE | 19840460 A1 | 3/1999 |
| EP | 0685639 A2 | 12/1995 |
| EP | 2009266 A2 | 12/2008 |
| EP | 2112368 A2 | 10/2009 |
| EP | 2312140 A1 | 4/2011 |
| GB | 605054 A | 7/1948 |
| GB | 658562 A | 10/1951 |
| GB | 1404495 A | 8/1975 |
| JP | 2008045463 A | 2/2008 |
| KR | 20010086517 A | 9/2001 |
| WO | 2006122427 A | 11/2006 |

OTHER PUBLICATIONS

International Preliminary Report on Patentability and Written Opinion of the International Bureau issued on Apr. 8, 2014 in connection with PCT/CA2012/050695.

Office Action_Search Report issued Aug. 19, 2015 in co-pending Chinese application.

Search Report issued Apr. 7, 2016, in connection with co-pending European Patent Application No. 12838463.3.

* cited by examiner

MODULE FOR MANAGING MASS FLOW AND DAMPENING PRESSURE PULSATIONS IN A GASEOUS FUEL SUPPLY LINE

CROSS-REFERENCE TO RELATED APPLICATIONS

This application is a continuation of International Application No. PCT/CA2012/050695 having an international filing date of Oct. 2, 2012 entitled "Module For Managing Mass Flow And Dampening Pressure Pulsations In A Gaseous Fuel Supply Line". The '695 international application claimed priority benefits, in turn, from Canadian Patent Application No. 2,754,183 filed on Oct. 5, 2011. The '695 international application is hereby incorporated by reference herein in its entirety.

FIELD OF THE INVENTION

The present invention relates to a module for managing mass flow and dampening the pressure pulsations generated by a pressure increasing device in a fuel supply line for a gaseous fuelled internal combustion engine.

BACKGROUND OF THE INVENTION

Presently, gaseous fuelled internal combustion engines for heavy duty trucks are gaining more recognition for operating efficiently with reduced levels of pollutants in the engine exhaust as compared to diesel or gasoline engines. Generally such engines are fuelled with natural gas, but other combustible gaseous fuels, such as methane, propane, butane, hydrogen, and blends of such fuels can be used. The gaseous fuel for fuelling an internal combustion engine can be stored in tanks either as compressed gas (for example, compressed natural gas (CNG)) or cryogenically in liquefied form (for example, liquefied natural gas (LNG)).

When gaseous fuel is stored in liquefied form, a pump can be used to increase the pressure of the LNG and to pump it from the storage tank into the fuel supply line. Along the fuel supply line, a vaporizer converts the LNG into vapor before supplying it to the engine's combustion chamber. When gaseous fuel is stored in a CNG tank, the pressure within the tank can be lower than the pressure needed to deliver the CNG into the combustion chamber, because the storage pressure drops when fuel is consumed by the engine. Therefore, the pressure of the CNG supplied to the engine has to be increased from the storage pressure to a higher pressure at which it will be injected into the combustion chamber through the fuel injectors. This can be done by a pressure amplifier, a compressor or other fuel pressure increasing device. For the high pressure needed to inject a gaseous fuel into a combustion chamber, pressure increasing devices, such as for example an LNG pump or a CNG pressure amplifier, typically use reciprocating pistons or some other means based on the positive displacement principle and such devices can introduce pressure pulsations into the gaseous fuel stream. If pressure pulsations are carried over to the fuel injectors, this can introduce errors in controlling the actual injected fuel quantity relative to a commanded injected fuel quantity.

During normal operation, there can be times when there are sudden fuel demands that cannot be immediately met by the pump alone and therefore many of the existing engine fuel supply systems comprise an accumulator which temporarily stores an amount of fuel supply at a pressure required for injection into the combustion chamber and makes it readily available to the engine when needed. In its simplest form, an accumulator is a storage tank that is connected to the fuel supply line, and to be effective, the accumulator serves as a reservoir that is sized large enough to reduce pressure fluctuations caused by pulsations generated by the pressure increasing device and by sudden fuel demands that exceed the capacity of the flow rate through the pressure increasing device. However, a disadvantage of gaseous fuel accumulators is that they are large. If not designed specifically for engine applications, they can be relatively expensive and can also require frequent safety inspections.

Gaseous fuel supply systems often require additional components such as filters, which remove impurities from the fuel supplied to the combustion chamber, pressure and/or temperature sensors, which can provide feedback to the control system for regulating the fuel pump strokes, and safety and control devices, such as pressure relief valves. Such components are fluidly connected to the fuel supply line and between each other through multiple plumbing devices (for example, fittings, adaptors) which increase the risk of leaks and therefore diminish the overall reliability of the fuel supply system.

There can also be pressure pulsations introduced into other parts of the fuel system, such as pressure pulsations introduced into the fuel rail that supplies fuel to the fuel injectors, caused by the cyclical actuation of the fuel injectors. Such a problem has been addressed in the prior art, for example in United States Pat. App. Pub. No. US 2002/0043249 A1, which describes a fuel rail comprising several dampening sections, each section comprising two dampening members, disposed opposite each other and offset at a predetermined distance to cause a transverse direction change of the fuel flow which attenuates the pressure pulsations within the fuel rail. Alternatively, the fuel rail can comprise an integrally formed dampening section of a smaller inner diameter than the main portion of the fuel rail. The effect of the reduced cross-section of the rail is to reflect a portion of the pressure waves back into oncoming pressure waves, thereby at least partially cancelling the pressure pulsations produced within the fuel rail. Such arrangements claim to be effective for dampening the relatively low frequency and low amplitude pressure pulsations within the fuel rail caused by the cyclic operation of the fuel injectors, but they do not address the higher frequency pulsations that can be introduced into a fuel supply line by a pressure increasing device.

Other devices are known from the prior art for dampening pressure pulsations generated in gas streams by a piston type compressor whose operation can trigger such pressure waves. As described in British Pat. Nos. 605,054 and 658,562, and in U.S. Pat. No. 2,795,374, such devices generally comprise an elongated housing having at least two separate chambers, one communicating with the gas inlet and the other communicating with the gas outlet and a pipe of a greater length than that of the elongated housing, the pipe forming an elongated passage fluidly connecting the at least two chambers. When gas flows through the relatively restricted and elongated passage formed by the pipe, the pressure pulsations within the gas stream are dampened. However, such devices for dampening pressure pulsations require additional elements, as described above, which add to their constructional complexity.

Therefore there is a need for a simple, more compact, cheaper module for dampening the pressure pulsations of a relatively medium frequency generated by a pressure increasing device installed in the gaseous fuel supply system of a gaseous fuelled internal combustion engine system and for managing flow therethrough.

SUMMARY OF THE INVENTION

A module manages mass flow and dampening pressure pulsations in a gaseous fuel supply line of an internal combustion engine. The module comprises:
(a) a hollow body having an inlet and an outlet, the hollow body defining an expanded volume through which fuel flows between the module's inlet and outlet,
(b) a pressure sensor mounted on the module's body for measuring the pressure within the module's expanded volume, and
(c) a temperature sensor mounted on the module's body for measuring the temperature from within the module's expanded volume.

Herein, by "expanded volume" it is understood that the cross-sectional flow area of the module is larger than the cross-sectional flow area of the fuel supply line that delivers fuel from a pressure increasing device to the module and from the module to the engine.

The module is located along the gaseous fuel supply line between a pressure increasing device and the engine such that a gaseous fuel supplied from the pressure increasing device flows through the module before it is supplied to the engine's fuel rail. The module is different than the accumulators used in the prior art systems because the fuel supplied by the pressure increasing device is not stored within the module, but rather flows through the expanded volume of the module to be supplied to the fuel rail. As used herein, the term "rail" means a conduit, bore, or pipe that functions as a manifold for distributing fuel to the fuel injectors. The fuel rail can have the same cross-section as the fuel supply line or, preferably, has a larger cross-section than the fuel supply line. The pressure increasing device can be a liquid fuel pump placed inside or outside of the fuel tank, a gaseous fuel compressor, a pressure amplifier or any other pressure increasing device, preferably of a positive displacement type. The pressure and temperature measurements taken by the pressure and temperature sensors are communicated to a controller which manages the flow through the fuel supply line by stopping or activating the pressure increasing device to maintain a pressure within the module within a predetermined pressure range.

The module has a hollow body, preferably of an elongated shape.

The module can comprise an overpressure protection device, preferably a pressure relief valve which is mounted on the body of the module. Any other overpressure protection devices, such as rupture disc or rupture pin type devices can be used instead of the pressure relief valve. The overpressure protection device is fluidly connected to the module's inlet or to its expanded volume and vents some fuel from the module if the pressure within the module exceeds a predetermined upper limit.

The module can further comprise a filter disposed within the module's hollow body such that gaseous fuel entering the module through the inlet flows through the filter before exiting the module through the outlet. The filter can have a cylindrical or a planar shape. When the module comprises both an overpressure protection device and a filter, the overpressure protection device is preferably connected to the module's inlet or expanded volume upstream of the filter for a more accurate sensing of the pressure within the module.

In a preferred embodiment, the hollow body of the module can be disassembled into at least two parts for an easier access to the expanded volume of module, when it is not in use. In some other embodiments, the parts of the module's hollow body can be welded together after the module's components have been installed, for example, after the filter has been installed within the expanded volume of the module in its operative position.

In some embodiments, a perforated tube is mounted within the module's hollow body in direct fluid communication with the inlet such that a turbulent motion is created in the gaseous fuel when it flows through the perforations of the tube into the expanded volume after it enters the module through the inlet.

In some embodiments, the module's inlet comprises a conduit leading to an opening into the expanded volume of the module and the transverse cross-sectional area of the opening can be larger than that of the conduit to impart a swirling motion to the gaseous fuel entering the module. Alternatively, the conduit portion of the inlet can be provided with a continuous helical channel that imparts a swirling motion to the gaseous fuel entering the expanded volume of the module.

In some embodiments of the present module, the filter is installed within the module's expanded volume such that it is in direct fluid communication with the module's inlet, while in other embodiments the filter is installed such that it is in direct fluid communication with the module's outlet. In yet some other embodiments, the filter can extend along the entire length of the expanded volume of the module between the module's inlet and outlet such that fuel flowing through the module has to pass through the filter's screen mesh before exiting the module through the outlet.

In a preferred embodiment of the present invention, the module for managing mass flow and dampening pressure pulsations in a gaseous fuel supply line of an internal combustion engine comprises:
(a) an elongated hollow body having an inlet and an outlet, wherein the hollow body defines an expanded volume through which fuel flows between the inlet and the outlet,
(b) a pressure sensor mounted on the module's body, the sensor measuring the pressure within the expanded volume of the module,
(c) a temperature sensor mounted on the module's body, the temperature sensor measuring the temperature from within the expanded volume of the module,
(d) a filter of a cylindrical shape disposed within the module's hollow body in direct fluid communication with the module's outlet such that a gaseous fuel entering the module through the inlet flows through the filter before exiting the module through the outlet, and
(e) a pressure relief valve mounted on the module's body, wherein the pressure relief valve is in direct fluid communication with the expanded volume of the module, upstream of the filter.

In this embodiment, the module's hollow body can be disassembled, when the module is not being used, into a main elongated part and two end parts. The pressure sensor, the temperature sensor and the pressure relieve valve are preferably mounted on one of the end parts that is provided with said module's inlet and the filter is preferably mounted on the end part of the body that is provided with the module's outlet.

According to the present invention, a fuel supply line of an internal combustion engine for supplying a gaseous fuel from a fuel tank through a pressure increasing device to a fuel rail that delivers fuel to a fuel injector of the engine can comprise a module for managing mass flow and dampening pressure pulsations in the gaseous fuel, the module being located along the fuel supply line whereby the gaseous fuel that flows between the pressure increasing device and the fuel rail must flow through the module. The module has a hollow body defining an expanded volume that is fluidly connected to (a) a pressure sensor which measures pressure within the module's expanded volume, and to (b) a temperature sensor which measures temperature within the module's expanded volume. The respective pressure and temperature measurements taken by the pressure and temperature sensors are communicated to a controller which stops or activates the pressure increasing device to maintain a pressure within the module within a predetermined pressure range.

The fuel supply line can further comprise a pressure relief valve mounted on the body of the module for protecting it against over-pressurization, the pressure relief valve being fluidly connected to the module's expanded volume. The pressure relief valve allows venting some gaseous fuel when the pressure within the module exceeds a predetermined upper limit.

The fuel supply line can further comprise a filter disposed within the module's expanded volume whereby gaseous fuel must flow through the filter when flowing through the expanded volume. The filter can have a cylindrical or a planar shape. When the fuel supply line comprises both a pressure relief valve and a filter, the pressure relief valve is preferably fluidly connected to the expanded volume of the module, upstream of the filter.

The body of the module can be disassembled into at least two parts for accessing the module's expanded volume when the module is not being used.

The fuel supply line can comprise a perforated tube that is mounted within the module's hollow body in direct fluid communication with an inlet of the module whereby the fuel flows through the perforations of the tube and into the expanded volume of the module after entering the module through the inlet. This creates a turbulent motion within the gaseous fuel entering the module and has a dampening effect on the pressure pulsations existent in the gaseous fuel entering the module.

In some embodiments, the inlet of the module comprises a conduit leading to an opening into the expanded volume of the module and a transverse cross-sectional area of the opening is larger than that of the conduit. This arrangement of the inlet imparts a swirling motion to the gaseous fuel entering the module which is beneficial for dampening the pressure pulsations from the gaseous fuel. Alternatively, the inlet of the module comprises a conduit which is provided with a continuous helical channel that imparts a swirling motion to the gaseous fuel entering the expanded volume of the module.

A system for managing mass flow and dampening pulsations generated by a pressure increasing device in a gaseous fuel supply line of an internal combustion engine comprises a module as described above and a controller which stops or activates the pressure increasing device that supplies fuel from the fuel tank to the engine through the module to maintain a pressure within the module within a predetermined pressure range.

A method is provided for managing mass flow and dampening pressure pulsations generated by a pressure increasing device in a gaseous fuel supply line of an internal combustion engine. The method comprises:

(a) increasing the pressure of a gaseous fuel with a pressure increasing device;

(b) delivering gaseous fuel to an inlet of a module having a hollow body which defines an expanded volume, whereby the gaseous fuel flows through the module's expanded volume and exits the module through an outlet;

(c) measuring the pressure and temperature from within the expanded volume of the module and communicating the pressure and temperature measurements to a controller, (d) at the end of an intake stroke of the pressure increasing device, before commanding a discharge stroke, calculating a predicted pressure within the expanded volume at the end of the next discharge stroke, if a discharge stroke is commanded, and (e) suspending operation of the pressure increasing device if the predicted pressure is higher than a predetermined upper pressure limit.

In some embodiments, the method comprises reactivating the pressure increasing device when the measured pressure within the expanded volume equals to or is lower than a predetermined lower pressure limit.

In other embodiments, the method comprises reactivating the pressure increasing device when the predicted pressure within the expanded volume of the module at the end of a discharge stroke, if such a discharge stroke is commanded, is lower than the predetermined upper pressure limit.

The predicted pressure within the expanded volume is calculated as a function of at least one parameter that can be the pressure or the temperature measured within the expanded volume at the end of the intake stroke, a fuel delivery amount or a fuel consumption amount. The fuel delivery amount is the amount or mass of fuel delivered by the pressure increasing device during a discharge stroke to the fuel supply line and the fuel consumption amount is the amount or mass of fuel consumed by the engine during the same period of time.

The method further comprises installing a filter within the module's expanded volume between the inlet and the outlet and filtering the gaseous fuel when it flows through the filter. When the module comprises a filter, the pressure and the temperature of the gaseous fuel is preferably measured upstream of the filter.

The method can further comprise protecting the module for over-pressurization by allowing venting of gaseous fuel from the module through an overpressure protection device fluidly connected to the expanded volume of the module, if the pressure within the expanded volume exceeds a predetermined value.

The method can further comprise creating a swirling motion of the gaseous fuel when it flows through the expanded volume of the module.

The swirling motion of the gaseous fuel can be created by introducing the gaseous fuel through an inlet comprising a conduit leading to an opening into the expanded volume, the opening having a transverse cross-sectional area that is larger than the cross-sectional area of the conduit. Alternatively, the swirling motion of the gaseous fuel can be achieved through an inlet having a conduit provided with a continuous helical channel.

The method can further comprise creating a turbulent fluid motion within the gaseous fuel flowing through the module's expanded volume. The turbulent fluid motion can be created by causing the gaseous fuel to flow through a perforated tube fluidly connected directly to the module's inlet before the gaseous fuel exits the module.

DETAILED DESCRIPTION OF PREFERRED EMBODIMENT(S)

Figure 1:
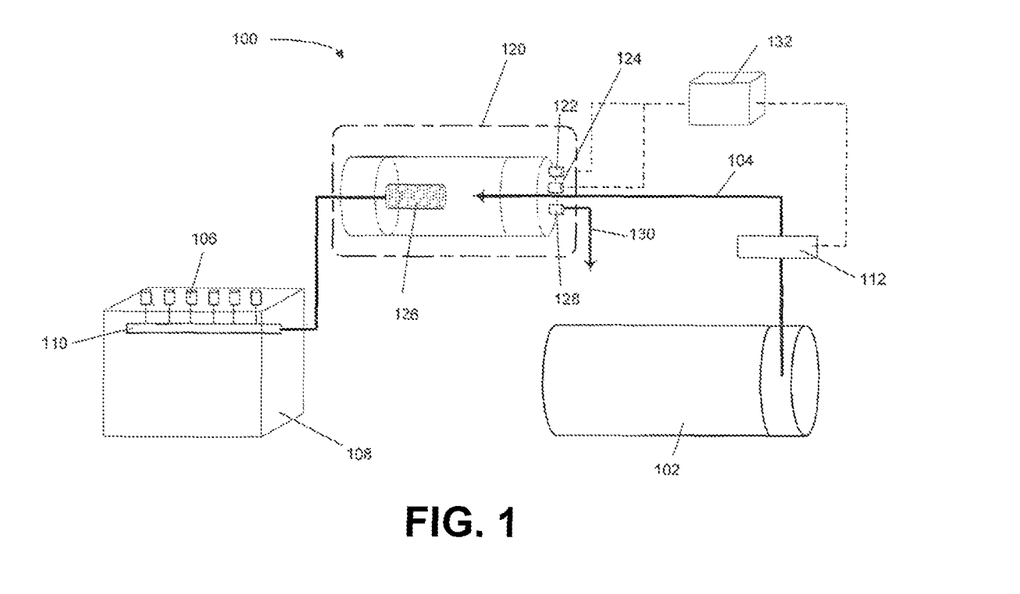
FIG. 1 is a schematic view of a gaseous-fuelled internal combustion engine system comprising a module for dampening the pressure pulsations and managing mass flow in the supply line.

FIG. 1 schematically illustrates a gaseous-fuelled internal combustion engine system comprising a module for dampening the pressure pulsations and managing mass flow in the fuel supply line. Preferably the fuel supplied to the engine is natural gas, but other combustible gaseous fuels, such as methane, propane, butane, hydrogen, and blends of such fuels could be used as well.

As further described below the body of the module for dampening the pressure pulsations in the supply line defines an "expanded volume" and by this it is understood that the cross-sectional flow area of the module is larger than the cross-sectional flow area of the fuel supply line that delivers fuel from a pressure increasing device to the module and from the module to the engine.

As illustrated in FIG. 1, engine system 100 comprises a fuel tank 102, which stores gaseous fuel either in gaseous form or as a cryogenic fluid. Fuel from tank 102 is supplied through fuel supply line 104 to fuel injectors 106, each of the fuel injectors injecting fuel into a combustion chamber of engine 108. The portion 110 of the fuel supply line that is in direct fluid communication with the fuel injectors is the fuel rail. Fuel rail 110 can have the same cross-section as fuel supply line 104 or, preferably, has a larger cross-section than fuel supply line 104, as illustrated in FIG. 1. As used herein the term "rail" means a conduit, bore, or pipe that functions as a manifold for distributing fuel to the fuel injectors.

Gaseous fuel can be stored in fuel tank 102 either in compressed form at high pressures, around 3600 psi (pounds per square inch), or as liquefied gas which is generally stored in a cryogenic tank at low temperatures (between −240° F. and −175° F.) and at lower pressures (between 15 and 200 psi). For example, for engines fuelled with natural gas, the fuel is stored either as CNG (compressed natural gas) or as LNG (liquefied natural gas). By way of example, the energy density of LNG, depending on its comparative pressure and temperature, is approximately four times that of CNG. Natural gas stored as LNG allows more fuel to be stored per unit volume and therefore, for internal combustion engine systems, it is generally preferred to store fuel in liquefied form at lower pressures.

In either case, the pressure of the fuel stored in fuel tank 102 has to be raised to the pressure at which the fuel can be injected into the engine's combustion chamber. Depending on the engine design and the method of injecting the fuel into the combustion chamber, the fuel injection pressure can be higher than its storage pressure. For example, for an engine used to power a heavy vehicle like a truck, in order to inject gaseous fuel directly into the engine's combustion chamber, a fuel injection pressure of about 3000 psi or higher (4000 psi) is typically needed or at least desirable. For other engines that inject fuel into an engine's intake manifold or into the intake ports on the manifold side of the engine's intake valves, fuel injection pressure is lower, generally between 15 and 220 psig, but this pressure could be still higher than the fuel storage pressure, for example when the engine is operating at a higher load or speed.

A fuel pressure increasing device 112 is used to raise the pressure of the fuel from the storage pressure to the pressure at which it can be supplied to the fuel injectors. If gaseous fuel is stored in liquefied form, for example in a LNG tank, a fuel pump is employed as a fuel pressure increasing device and if the fuel is stored in compressed form, for example in a CNG tank, a fuel pressure amplifier or compressor can be used as a pressure increasing device 112. The LNG fuel pump can be placed outside the fuel tank, on the fuel supply line 104, as illustrated in FIG. 1 or it can be placed inside the fuel tank as described, for example, in the applicant's U.S. Pat. Nos. 7,913,496, 7,356,996 and 7,293,418.

During its operation, fuel pressure increasing device 112 generates pressure pulsations that can be transmitted through fuel supply line 104 to fuel rail 110 and further to injectors 106. To prevent this, a module 120 for dampening such pressure pulsations is placed along fuel supply line 104 between pressure increasing device 112 and fuel rail 110 such that fuel delivered by pressure increasing device 112 has to flow through module 120 before reaching fuel rail 110.

Module 120 comprises a body that defines a predetermined expanded volume, as further described below, and is provided with pressure sensor 122 and temperature sensor 124 for measuring the pressure and the temperature of the gaseous fuel within the module. Such pressure and temperature measurements are used by controller 132 for managing the mass flow into the module by controlling the operation of pressure increasing device 112 as explained further below. In some preferred embodiments, module 120 can be further provided with filter 126 placed inside the module's body and overpressure protection device 128 for venting gaseous fuel through vent line 130 when the pressure at the point of measurement, within the module's body, exceeds a predetermined safe limit. Overpressure protection device 128 is preferably a pressure relief valve, but other overpressure protection devices such as rupture disc or rupture pin type devices can also be employed.

As illustrated in FIG. 1, module 120 is different than the accumulators used in the internal combustion engine systems known in the prior art because fuel is not stored within the expanded volume of the module, but instead flows through the module before it is supplied to the fuel rail.

Figure 2:
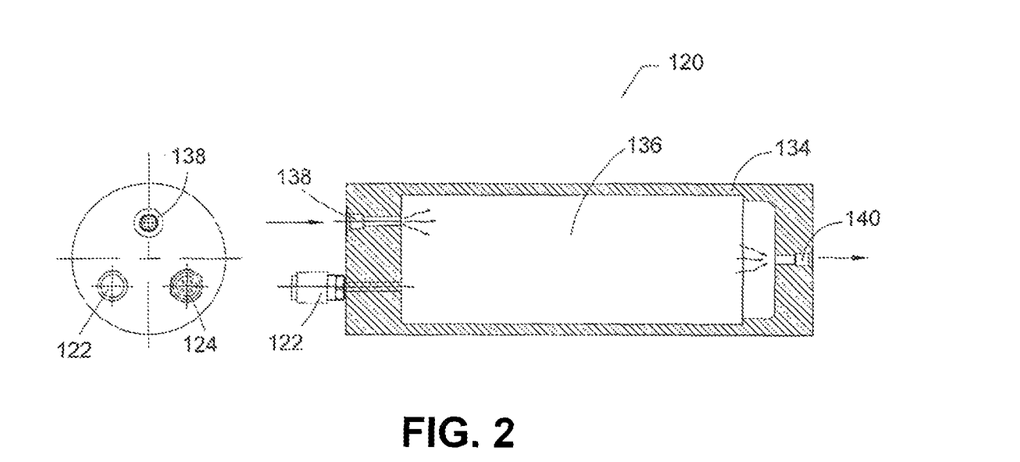
FIG. 2 shows a section view and a side view of a module for dampening the pressure pulsations and managing mass flow in a gaseous fuel supply line, the module comprising a pressure and a temperature sensor.

A cross-sectional view through one of the embodiments of module 120 is illustrated in FIG. 2. Module 120 has a body 134 which defines an expanded volume 136 and is provided with an inlet 138 and an outlet 140. Inlet 138 is fluidly connected to fuel supply line 104 such that fuel from the pressure increasing device 112 is supplied to the module as illustrated in FIG. 1. Outlet 140 is fluidly connected to the portion of the fuel supply line that supplies fuel to fuel rail 110. Pressure sensor 122 and temperature sensor 124 are mounted on the module's body 134 and are fluidly connected to expanded volume 136 such that they can measure the average pressure and, respectively, the average temperature of the gaseous fuel inside volume 136. In preferred embodiments, pressure sensor 122 is placed in fluid communication with expanded volume 136 in the proximity of inlet 138. Preferably, temperature sensor 124 is positioned such that it the sensor's probe measures the temperature of the gaseous fuel in the central area of the module or in a position that gives a good representation of the average temperature of the gaseous fuel in the module. Temperature sensor 124 has to be in direct contact with expanded volume 136, and, preferably, the sensor's probe (not illustrated in FIG. 2), which protrudes into the expanded volume should not be in close proximity to the internal walls of the module's body.

Module 120 is designed to have a predetermined expanded volume such that it achieves the dampening of the pressure pulsations within the fuel stream generated by pressure increasing device 112. After entering the module, through inlet 138, the gaseous fuel stream is dispersed within the module's expanded volume 136 which has a larger cross-sectional area than the fuel supply line connected to inlet 138. This expansion of the gaseous fuel has the effect of substantially dampening the pressure pulsations that are generated in the gaseous fuel stream by the pressure increasing device.

Other embodiments of the module are illustrated in FIGS. 3-9. These embodiments have many components that are equivalent to like components of the embodiment presented in FIG. 2 and like components are identified by like reference numbers. In this disclosure, like-numbered components function in substantially the same way in each embodiment. Accordingly, if like components have already been described with respect to one embodiment, while identified in the figures for other embodiments, the purpose and function of like components may not be repeated for each of the illustrated embodiments.

Figure 3:
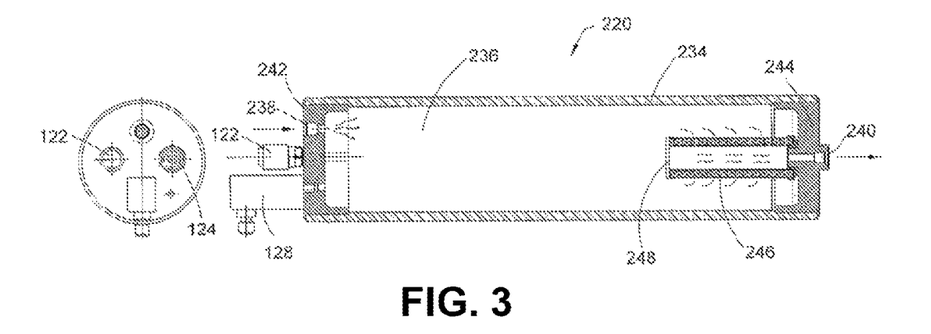
FIG. 3 shows a section view and a side view of a preferred embodiment of the module comprising a pressure and a temperature sensor, a pressure relief valve, and a filter.

In a preferred embodiment illustrated in FIG. 3, module 220 comprises a body that can be disassembled in three parts, when the module is not in use: an elongated main part 234 and two end parts 242 and 244. This allows easier access to the inside of the module for mounting different components as further described below. End parts 242 and 244 are assembled together with main part 234 by using a threaded connection or by pressing. Main part 234 and end parts 242 and 244 define an expanded volume 236 of a predetermined size. Gaseous fuel supplied from the pressure increasing device through the fuel supply line enters the module through inlet 238, provided on first end part 242. Gaseous fuel is dispersed within the expanded volume 236 and exits the module through outlet 240 provided on second end part 244. Similarly to the embodiment illustrated in FIG. 2, module 220 is provided with a pressure sensor 122 and a temperature sensor 124, both sensors being mounted on first end part 242 in direct fluid communication with the module's expanded volume.

Module 220 can also comprise overpressure protection device 128 which, in the illustrated embodiment, is mounted on first end part 242 such that it is in direct fluid communication with expanded volume 236. Overpressure protection device 128 is preferably a pressure relief valve, but other devices such as rupture disc or rupture pin type devices can be used.

Module 220 can further comprise filter 246 which can be mounted on second part 244 for easier replacement. In embodiments where module 220 comprises a filter, as illustrated in FIG. 3, parts 234, 242 and 244 of the module's body could be assembled together by welding and, in these embodiments, the filter should be installed within the module's expanded volume before welding together parts 234, 242 and 244.

In the embodiment illustrated in FIG. 3, filter 246 has a tubular shape and is provided with cap 248 such that fuel entering the filter through its tubular screen mesh has to exit the filter only through the filter's end that is fluidly connected to outlet 240. In this way, the gaseous fuel flowing through the module has to pass through the filter's screen mesh before exiting the module through outlet 240.

In the embodiment illustrated in FIG. 3, it is preferred that pressure sensor 122 and overpressure protection device 128 are placed upstream of the filter so that they measure the pressure of the gaseous fuel entering the module before it reaches the filter. This avoids inaccurate measurements in situations when the filter gets partially clogged.

Figure 4:
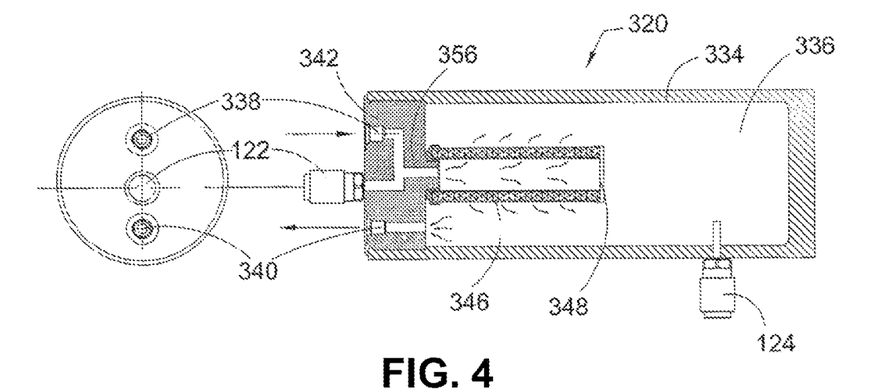
FIG. 4 shows a section view and a side view of an embodiment of the module comprising a pressure and a temperature sensor and a filter fluidly connected directly to the module's inlet.

In another embodiment illustrated in FIG. 4, module 320 can be disassembled into two parts, when not in use, a main part 334 and one end part 342. Filter 346 is mounted on end part 342 for easier replacement. Main part 334 and end part 342 define, when assembled together, an expanded volume 336. Gaseous fuel supplied from the fuel tank through the pressure increasing device enters the module through inlet 338 and exits the module through outlet 340, both inlet 338 and outlet 340 being provided on end part 342. Similarly to the embodiments illustrated in FIGS. 2 and 3, module 320 is provided with pressure sensor 122 and temperature sensor 124. Pressure sensor 122 is mounted on end part 342 and it is in direct fluid communication with inlet 338. Temperature sensor 124 is mounted directly on main part 334 such that its probe measures the temperature of the gaseous fuel in an area closer to the center of the module and in a position that gives a good representation of the average temperature of the gaseous fuel in the module.

Filter 346 has a cylindrical shape and is positioned within expanded volume 336 in close proximity to the conduit portion 356 of inlet 338, that communicates with expanded volume 336 of the module, such that fuel entering the module through inlet flows through the filter before exiting the module through outlet 340. Filter 346 of a cylindrical shape has a cap 348 and it is positioned in direct fluid communication with conduit 356 of the inlet such that gaseous fuel supplied to inlet 338 flows outwardly through the filter's screen mesh into the expanded volume 336 before exiting the module through outlet 340. As illustrated in FIG. 4, pressure sensor 122 is placed upstream of filter 346, in direct fluid communication with inlet 338, to avoid inaccurate measurements that could be introduced by the filter's clogging.

Figure 5:
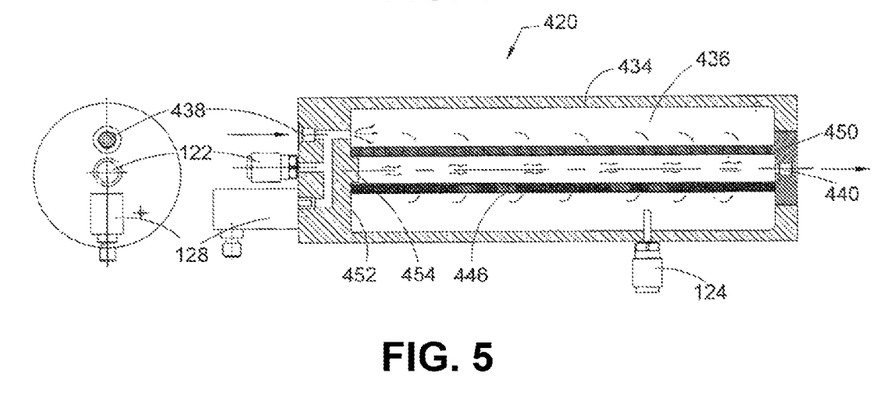
FIG. 5 shows a section view and a side view of an embodiment of the module comprising a pressure and a temperature sensor, a pressure relief valve and a filter in the shape of a tube that extends along the entire length of the expanded volume of the module between inlet and outlet.

In yet another embodiment illustrated in FIG. 5, module 420 comprises a body 434 which defines an expanded volume 436. Gaseous fuel supplied from the pressure increasing device to inlet 438 is dispersed in the module's expanded volume 436 and exits the module through outlet 440. Pressure sensor 122 is mounted directly on the module's body 434 and is in direct fluid communication with inlet 438. Temperature sensor 124 is mounted directly on the module's body 434 and is preferably placed closer to outlet 440. This embodiment of the module further comprises an overpressure protection device 128 which is mounted on the module's body 434 and is in direct fluid communication with inlet 438.

In this embodiment, module 420 is provided with filter 446 of a cylindrical shape which extends along the entire length of the module's expanded volume 436, as illustrated in FIG. 5. Filter 446 is mounted on plate 450 which can be assembled with the module's body 434, for example through a threaded connection. Preferably, the other end of filter 446 is supported by a profile 454 of the module's interior wall 452. The module's outlet is provided on plate 450 so that during the module operation, the outlet is in direct fluid communication with the filter. Filter 446 can be easily replaced by disengaging plate 450 from its threaded connection to the module's body.

In this embodiment, module's body 434 can have a monobloc construction, as illustrated in FIG. 5, or can be made of several parts welded together, for example a main elongated part and two end parts.

Figure 6:
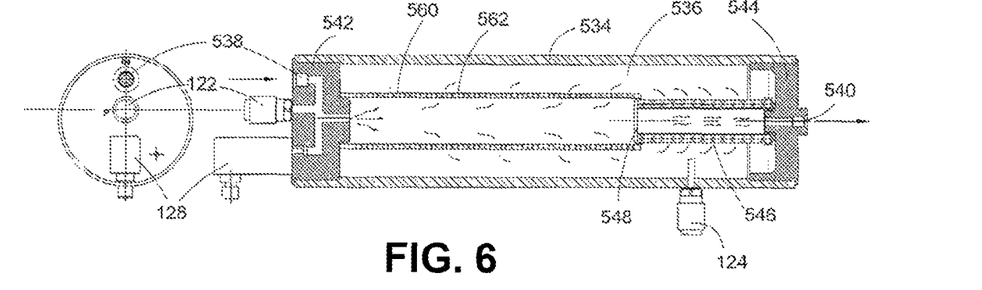
FIG. 6 shows a section view and a side view of an embodiment of the module comprising a perforated tube which generates a turbulent motion within the gaseous fuel stream entering the module.

FIG. 6 shows another embodiment of the present module. Module 520 comprises a body which consists of main part 534, a first end part 542 and a second end part 544 which define, when assembled together, an expanded volume 536. Module's inlet 538 is provided on first end part 542 and module's outlet 540 is provided on second end part 544. First end part 542 also carries pressure sensor 122 which is in direct fluid communication with inlet 538. Temperature sensor 124 is preferably mounted directly on body 534 closer to the outlet. Overpressure protection device 128 is mounted on first end part 542 and is in direct fluid communication with inlet 538. Module 520 also comprises filter 546 which is installed on second end part 544 such that when end part 544 is assembled with module body 534, the filter is positioned within expanded volume 536. Filter 546, of a cylindrical shape, has a cap 548 and is installed in the proximity of outlet 540 such that fuel entering the module through inlet 538 has to flow through the filter's screen mesh before exiting the module through outlet 540.

The embodiment illustrated in FIG. 6 further comprises a perforated tube 560 which is placed within expanded volume 536 and extends between first end part 542 and filter 546, such that the gaseous fuel stream entering the module through inlet 538 flows through the tube's perforations 562 before reaching the filter's screen mesh. A turbulent motion is generated in the gaseous fuel after it passes through perforations 562 and such motion helps further dampen the pressure pulsations within the gaseous fuel entering the module.

Figure 7:
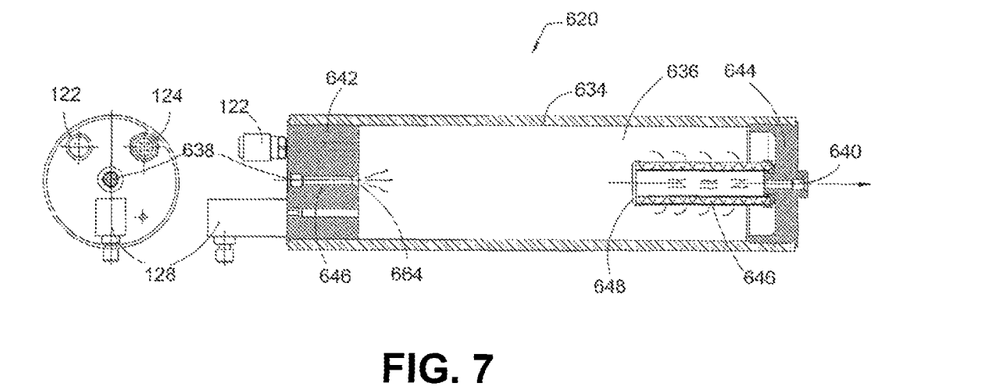
FIG. 7 is shows a section view and a side view of another embodiment of the module showing an inlet of the module having an enlarged cross-section towards an opening into the expanded volume of the module.
Figure 8:
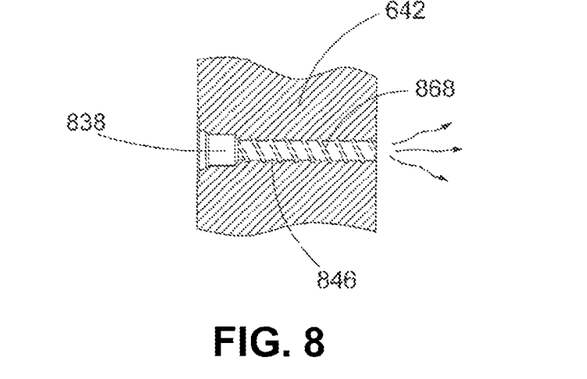
FIG. 8 is an enlarged view of a cross-section through an inlet of the present module wherein the conduit portion of the inlet is provided with a helical channel for imparting a swirling motion to the gaseous fuel entering the module.

Another method of enhancing the pressure pulsations dampening effect within the expanded volume of the module is imparting a swirling motion to the gaseous stream entering the module. One example of achieving this is illustrated in FIG. 7. The body of module 620 comprises a main part 634 and two end parts 642 and 644, which allow easier access to the inside of the module, when not in use. As in the other embodiments described above, module 620 is provided with a pressure sensor 122, a temperature sensor 124, an overpressure protection device 128 and a filter 646 provided with a cap 648. All these components operate in a similar way as described above in connection with the previous embodiments. Body 634 and removable sections 642 and 644 define, when assembled together, an expanded volume 636 through which a gaseous fuel stream flows after entering the module through inlet 638 and before exiting the module through outlet 640.

Fuel is supplied from the pressure increasing device to the module through inlet 638. Inlet 638 comprises a portion shaped as a conduit 646 and has an opening 664 into the module's expanded volume. Opening 664 has a larger cross-sectional area than the cross-sectional area of conduit 646. The transition area between conduit 646 and opening 664 can have a frusto-conical or a conical shape, or it can be another shape that would impart a swirling motion to the gaseous fuel entering the module. This helps dampening the pressure pulsations within the gaseous fuel stream. In another embodiment illustrated in FIG. 8, conduit portion 846 of inlet 838 can be provided with a continuous helical channel 868 for achieving a similar effect of imparting a swirling motion to the gaseous fuel entering the expanded volume of the module.

Figure 9:
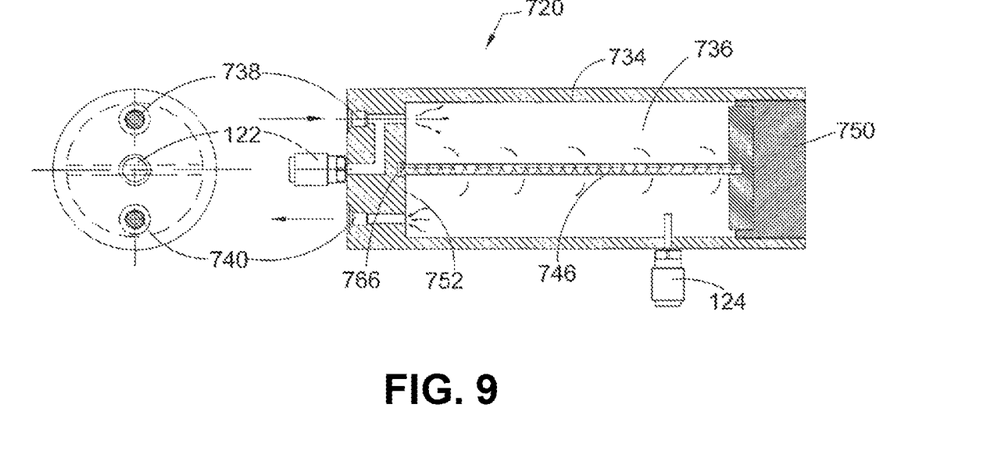
FIG. 9 is a section view and a side view of an embodiment of the module comprising a filter of a planar shape, the filter extending along the entire length of the expanded volume of the module between inlet and outlet.

Another embodiment of the present module is illustrated in FIG. 9. Module 720 has a body 734 which defines an expanded volume 736 and comprises an inlet 738 and an outlet 740. The module further comprises a pressure sensor 122 that is direct fluid communication with inlet 738 and a temperature sensor 124 that is in direct contact with the expanded volume 736.

Module 720 further comprises filter 746 which extends along the entire length of the expanded volume, as illustrated in FIG. 9. Filter 746 is mounted on plate 750 which can be assembled with body 734 through a threaded connection. Filter 745 has a planar shape and extends in longitudinal direction between the interior walls of module's body 734 such that substantially all gaseous fuel entering the module through inlet 738 flows through filter 746 before exiting the module through outlet 740. Preferably, filter 746 is supported in a channel 766 provided on interior wall 752 of the module's body 734. In this arrangement filter 746 can be easily replaced by disengaging plate 750 from its threaded connection with the module's body.

The present module for dampening the pressure pulsations generated in the gaseous fuel supply line of a gaseous fuelled internal combustion engine has a predetermined expanded volume whose dimensions are preferably minimized to allow a more convenient installation of the module along the fuel supply line. The pressure and the temperature of the gaseous fuel within the module are continually measured and flow of gaseous fuel through the module is managed such that the pressure within the module is maintained within a predetermined range, between a minimum pressure limit $P_{min}$ and a maximum pressure limit $P_{max}$. The pressure and temperature measurements are taken with pressure sensor 122 and, respectively, temperature sensor 124 which are installed, as described above, at a convenient location such that their measurements are reflective of the average pressure and temperature of the gaseous fuel within the module. These measurements are communicated to controller 132 and are used for controlling pressure increasing device 112 as further described below.

When fuel stored within tank 102 is LNG, pressure increasing device is preferably a single acting reciprocating piston pump. The present pump control method is described using the example of a single acting reciprocating piston pump and the method can be applied to other types of pump or pressure increasing device of a positive displacement type that are used for pumping fuel, in liquid and/or gaseous form, from a storage tank to the engine.

In a reciprocating pump, a volume of fluid is drawn into the cylinder on the intake stroke and it is discharged under positive pressure on the discharge stroke. The intake and the discharge stroke together make one pump cycle. In a piston reciprocating pump, the intake stroke is achieved by moving the piston within the pump's cylinder to a retracted position such that fuel from the fuel tank is sucked into the pump's cavity and the discharge stroke is achieved by extending the piston within the cylinder from the retracted position to an extended position such that fuel can be pressurized within the pump's cavity and can be further delivered to the fuel supply line.

Figure 10:
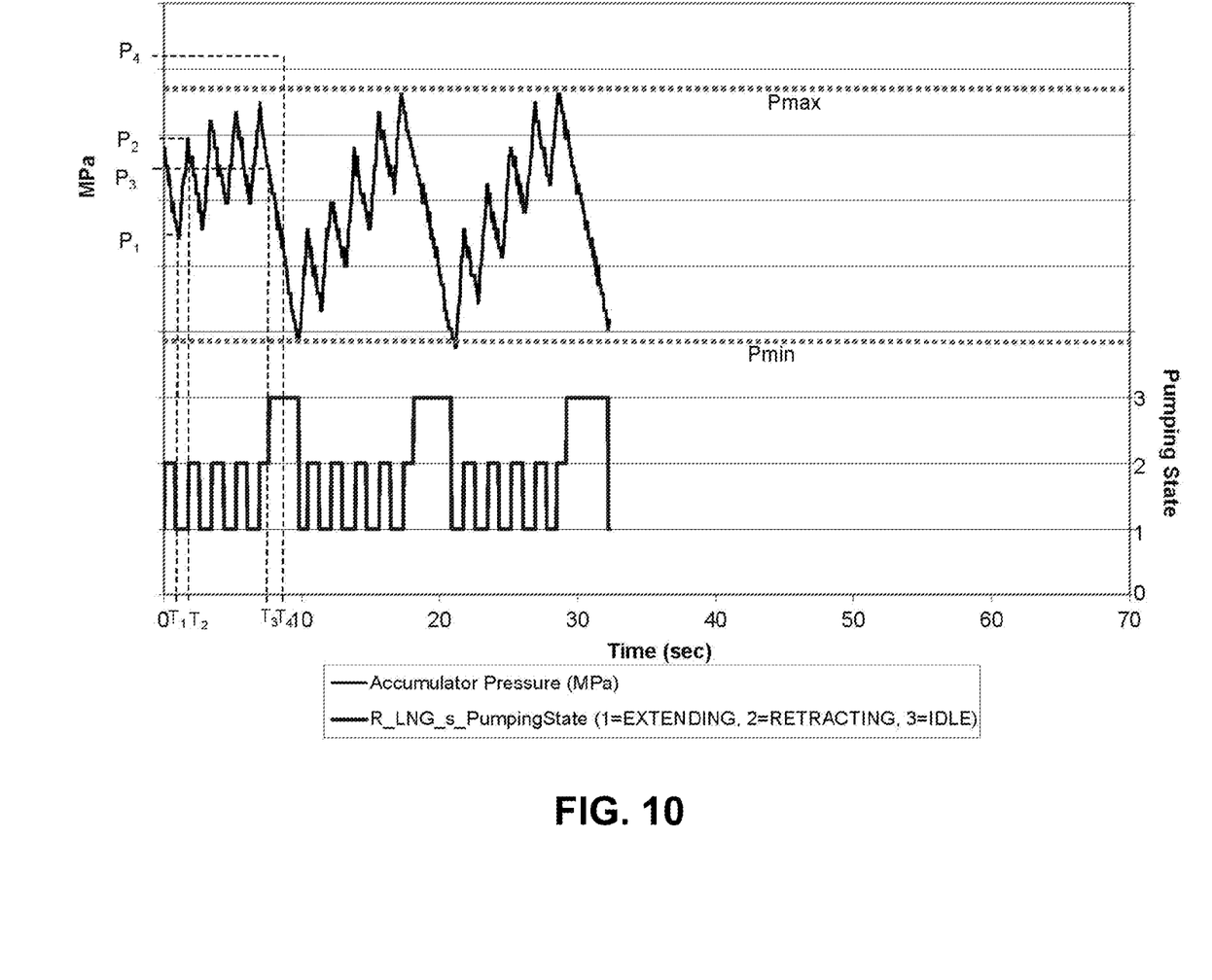
FIG. 10 is a graph that plots the fuel pressure generated within the present module over time when the pump increasing device operates to deliver fuel to the fuel supply line.

The present control method will now be described in relation with FIG. 10 which illustrates the fuel pressure within the module 120 over time, for several successive pump cycles. The extending position of the piston is illustrated as reference number 1 along the "pumping state" axis and the retracting position of the piston and the idle state of the pump are illustrated as reference number 2 and respectively reference number 3 on the same axis. The pressure and the temperature within module 120 are measured continuously and a predicted pressure within the module is calculated at the end of each intake stroke for each pump cycle, more specifically every time the piston is in a fully retracted position. For example the measured pressure within the module at a point $T_1$ which represents the end of the intake stroke of the first pump cycle illustrated in FIG. 10 is $P_1$. The temperature of the gaseous fuel within the module at the same time $T_1$ is measured as a value $Temp_1$. The measured values $P_1$ and $Temp_1$ are communicated to controller 132 which calculates a predicted pressure $P_2$ within the module at the end of the discharge stroke, if such a discharge stroke would be commanded, for example at a point $T_2$ which represents the end of the discharge stroke of the first pump cycle illustrated in FIG. 10. The controller calculates the predicted pressure $P_2$ as a function of the measured pressure and temperature within the module at the end of a pump intake stroke, based on the following formula:

$$\Delta P = Z \Delta m R \Delta T / V, \text{where}$$

$\Delta P$ is the difference between the predicted pressure within the module at the end of the discharge stroke and the measured pressure within the module at the end of the intake stroke, for example $\Delta P = P_2 - P_1$ for the first pump cycle illustrated in FIG. 10;

Z is the compressibility factor of the gaseous fuel and it is calculated according to known formula in the field, based on the pressure and temperature of the fuel within the module as measured by sensors 122 and 124;

$\Delta m = m_{compressed} - m_{consumed}$, whereby $\Delta m$ is the predicted change of the total fuel mass (amount) within the fuel supply line at the end the next discharge stroke of the pump, if such discharge stroke would be commanded, which is calculated by the controller as the difference between the estimated mass (amount) of fuel entering the fuel supply line during the next pump discharge stroke ($m_{compressed}$) and the estimated mass (amount) of fuel consumed by the engine during the next discharge stroke ($m_{consumed}$);

R is the ideal gas constant for natural gas;

$\Delta T = Temp_2 - Temp_1$ and is the difference between the predicted temperature $Temp_2$ within the module at the end of the discharge stroke and temperature $Temp_1$ within the module at the end of the intake stroke, measured by temperature sensor 124. $Temp_2$ can be predicted based on $Temp_1$ through a thermodynamic model or a lookup table, or it can be assumed to be unchanged from $Temp_1$ after the discharge stroke has completed; and V comprises the volume of the module and the volume of all conduits that make fuel supply line between the pressure increasing device and the fuel rail.

If the predicted pressure at the end of the discharge stroke, calculated according to the above formula, is lower than the predetermined pressure $P_{max}$ that is the maximum pressure limit for the module, the pump is commanded to move the piston into the extending position to execute the discharge stroke. For example, in the first pump cycle illustrated in FIG. 10, predicted pressure $P_2$ is lower than $P_{max}$ and the pump is commanded to execute a discharge stroke. The pressure within the module is measured at the end of the intake stroke for each of the next successive pump cycles and each time the controller calculates the predicted pressure within the module at the end of the discharge stroke, if such a discharge stroke would be commanded.

If the predicted pressure at the end of the discharge stroke of one of the pump cycles is higher than $P_{max}$ the pump is commanded to its idle position, no discharge stroke is commanded and no fuel is supplied to the module. For example, if the measured pressure within the module at point $T_3$, which represents the end of the intake stroke of the fifth pump cycle illustrated in FIG. 10, is $P_3$ and the predicted pressure $P_4$, which represents the pressure within the module at the end of the next discharge stroke, if such a discharge stroke would be commanded, more specifically at point $T_4$, is higher than $P_{max}$, the pump is commanded to its idle position. The pressure within the module drops during the time the pump is set on idle because no fuel is supplied to the module and, during the same time, fuel is discharged from the module to be consumed by the engine. In a preferred embodiment of the present control method, illustrated in FIG. 10, the pressure within the module is continuously monitored and the pump is switched to an active state when the measured pressure within the module drops to a value that is equal to or lower than a minimum pressure limit $P_{min}$ when the pump is commanded to execute a discharge stroke.

In other embodiments, after the pump is set on idle, the same calculations for the predicted pressure are repeated for next values of the measured pressure within the module until the predicted pressure within the module becomes less than $P_{max}$, when the pump is switched to an active state and a discharge stroke is commanded. In this method, the predicted pressure at the end of the discharge stroke is calculated continuously for each value of the pressure measured within the module, or it could be calculated at predetermined intervals. In such a control method the pump is switched from an idle state to an active state more often than in the first control method described above and therefore it is less preferred because it could affect the pump's life cycle.

FIGS. 2-9 are schematic representations of the module, and are not drawn to scale and do not show physical details such as how the module's body can be made from more than one part or how ring seals or gaskets are employed to render the module's body fluid-tight.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A multifunctional module for managing mass flow and dampening pressure pulsations in a gaseous fuel supply line of an internal combustion engine, said module comprising:
   (a) a hollow body having an inlet and an outlet, said hollow body defining an expanded volume through which fuel flows between said inlet and said outlet,
   (b) a pressure sensor mounted on said body, said pressure sensor measuring the pressure within said expanded volume, and
   (c) a temperature sensor mounted on said body, said temperature sensor measuring the temperature from within said expanded volume,
   wherein said module is located along said gaseous fuel supply line between a pressure increasing device and a fuel rail of said engine such that a gaseous fuel supplied from said pressure increasing device flows through said module before it is supplied to said fuel rail and wherein respective pressure and temperature measurements taken by said pressure and temperature sensors are communicated to a controller which stops or activates said pressure increasing device to maintain a pressure within said module within a predetermined pressure range.

2. The module of claim 1, wherein said hollow body has an elongated shape.

3. The module of claim 1, further comprising an overpressure protection device mounted on said body, said overpressure protection device being fluidly connected to said inlet or to said expanded volume.

4. The module of claim 1, further comprising a filter disposed within said hollow body such that said gaseous fuel entering said module through said inlet flows through said filter before exiting said module through said outlet.

5. The module of claim 4, wherein said filter has a cylindrical shape.

6. The module of claim 4, wherein said filter has a planar shape.

7. The module of claim 4, further comprising an overpressure protection device mounted on said body, said overpressure protection device being fluidly connected to said inlet or to said expanded volume, upstream of said filter.

8. The module of claim 1, wherein said hollow body can be disassembled into two parts for accessing said expanded volume when said module is not being used.

9. The module of claim 1, wherein a perforated tube is mounted within said hollow body in direct fluid communication with said inlet whereby said fuel flows through perforations in said perforated tube and into said expanded volume after entering said module through said inlet.

10. The module of claim 1, wherein said inlet comprises a conduit leading to an opening into said expanded volume and a transverse cross-sectional area of said opening is larger than that of said conduit.

11. The module of claim 1, wherein said inlet comprises a conduit leading to an opening into said expanded volume and said conduit is further provided on its interior wall with a continuous helical channel that imparts a swirling motion to said gaseous fuel entering said expanded volume of said module.

12. A multifunctional module for managing mass flow and dampening pressure pulsations in a gaseous fuel supply line of an internal combustion engine, said module comprising:
   (a) an elongated hollow body having an inlet and an outlet, said hollow body defining an expanded volume through which fuel flows between said inlet and said outlet,
   (b) a pressure sensor mounted on said body, said pressure sensor measuring the pressure within said expanded volume,
   (c) a temperature sensor mounted on said body, said temperature sensor measuring the temperature from within said expanded volume,
   (d) a filter of a cylindrical shape disposed within said hollow body in direct fluid communication with said outlet such that a gaseous fuel entering said module through said inlet flows through said filter before exiting said module through said outlet, and
   (e) a pressure relief valve mounted on said body, said pressure relief valve being in direct fluid communication with said expanded volume, upstream of said filter,
   wherein said hollow body can be disassembled into a main elongated part and two end parts when said module is not being used and wherein said pressure sensor, said temperature sensor and said pressure relieve valve are mounted on one of said end parts that is provided with said module's inlet and said filter is mounted on another end part of said body that is provided with said outlet.

13. A fuel supply line of an internal combustion engine for supplying a gaseous fuel from a fuel tank through a pressure increasing device to a fuel rail that delivers fuel to a fuel injector of said engine, said fuel supply line comprising a multifunctional module for managing mass flow and dampening pressure pulsations in said gaseous fuel, said module being located along said fuel supply line whereby said gaseous fuel that flows between said pressure increasing device and said fuel rail must flow through said module which has a hollow body defining an expanded volume that is fluidly connected to (a) a pressure sensor which measures pressure within said expanded volume, and to (b) a temperature sensor which measures temperature within said expanded volume and respective pressure and temperature measurements taken by said pressure and temperature sensors are communicated to a controller which stops or activates said pressure increasing device to maintain a pressure within said module within a predetermined pressure range.

14. The fuel supply line of claim 13, further comprising an overpressure protection device mounted on said body of said module, said overpressure protection device being fluidly connected to said expanded volume.

15. The fuel supply line of claim 13, further comprising a filter disposed within said expanded volume whereby said gaseous fuel must flow through said filter when flowing through said expanded volume.

16. The fuel supply line of claim 15, further comprising an overpressure protection device mounted on said body of said module, said overpressure protection device being fluidly connected to said expanded volume, upstream of said filter.

17. The fuel supply line of claim 13, wherein said body of said module can be disassembled into two parts for accessing said expanded volume when said module is not being used.

18. The fuel supply line of claim 13, wherein a perforated tube is mounted within said hollow body in direct fluid communication with an inlet of said module whereby said fuel flows through perforations in said perforated tube and into said expanded volume after entering said module through said inlet.

19. The fuel supply line of claim 13, wherein an inlet of said module comprises a conduit leading to an opening into said expanded volume and a transverse cross-sectional area of said opening is larger than that of said conduit.

20. The fuel supply line of claim 13, wherein an inlet of said module is further provided with a continuous helical channel that imparts a swirling motion to the gaseous fuel entering said expanded volume of said module.

21. A system for managing mass flow and dampening pulsations generated by a pressure increasing device in a gaseous fuel supply line of an internal combustion engine, said system comprising:
（a) the multifunctional module of claim 1; and
（b) a controller which stops or activates said pressure increasing device to maintain a pressure within said module within a predetermined pressure range.

22. A method of managing mass flow and dampening pressure pulsations generated by a pressure increasing device in a gaseous fuel supply line of an internal combustion engine, the method comprising:
（a) increasing the pressure of a gaseous fuel with a pressure increasing device;
（b) delivering said gaseous fuel to an inlet of a multifunctional module having a hollow body which defines an expanded volume, whereby said gaseous fuel flows through said expanded volume and exits said module through an outlet;
（c) measuring the pressure and temperature from within said expanded volume and communicating said pressure and temperature measurements to a controller,
（d) at the end of an intake stroke of said pressure increasing device, and before commanding a discharge stroke, calculating a predicted pressure within said expanded volume at the end of the next discharge stroke, if said discharge stroke is commanded, and
（e) suspending operation of said pressure increasing device if said predicted pressure is higher than a predetermined maximum pressure $P_{max}$.

23. The method of claim 22, further comprising reactivating said pressure increasing device when said measured pressure within said expanded volume equals to or it is lower than a predetermined minimum pressure $P_{min}$.

24. The method of claim 22, further comprising reactivating said pressure increasing device when said predicted pressure is lower than said predetermined maximum pressure $P_{max}$.

25. The method of claim 22, wherein said predicted pressure within said expanded volume is calculated as a function of at least one of said pressure or said temperature measured within said expanded volume at the end of said intake stroke or an estimated amount of fuel delivered to said module during said discharge stroke or an estimated amount of fuel consumed by said engine during said discharge stroke.

26. The method of claim 22, further comprising installing a filter within said expanded volume between said inlet and said outlet and filtering said gaseous fuel when it flows through said filter.

27. The method of claim 25, further comprising measuring the pressure and the temperature of said gaseous fuel upstream of said filter.

28. The method of claim 22, further comprising protecting said module for over-pressurization by allowing venting of gaseous fuel from said module through an overpressure protection device fluidly connected to said expanded volume of said module if pressure within said expanded volume exceeds a predetermined value.

29. The method of claim 22, further comprising creating a swirling motion of said gaseous fuel when it flows through said expanded volume of said module.

30. The method of claim 28, wherein said swirling motion of said gaseous fuel is created by introducing said gaseous fuel through an inlet comprising a conduit leading to an opening into said expanded volume and a transverse cross-sectional area of said opening is larger than that of said conduit.

31. The method of claim 22, further comprising creating a turbulent fluid motion within said gaseous fuel flowing through said expanded volume.

32. The method of claim 30, wherein said turbulent fluid motion is created by causing said gaseous fuel to flow through a perforated tube fluidly connected directly to said inlet of said module before said gaseous fuel exits said module.

* * * * *